United States Patent [19]

Moses et al.

[11] 4,401,735

[45] Aug. 30, 1983

[54] NON-AQUEOUS LI/MNO2 CELL

[75] Inventors: Peter R. Moses, Windham, N.H.; Alwyn H. Taylor, Wellesley Hills; Michael J. Turchan, Sudbury, both of Mass.

[73] Assignee: Duracell International Inc., Bethel, Conn.

[21] Appl. No.: 107,962

[22] Filed: Dec. 28, 1979

[51] Int. Cl.$^3$ .............................................. H01M 6/16
[52] U.S. Cl. ..................................... 429/195; 429/224
[58] Field of Search ................ 429/194, 197, 224, 195

[56] References Cited

U.S. PATENT DOCUMENTS

| | | | |
|---|---|---|---|
| 3,873,369 | 3/1975 | Kamenski | 429/194 |
| 4,018,970 | 4/1977 | Gabano | 429/194 |
| 4,071,665 | 1/1978 | Garth | 429/197 |
| 4,084,045 | 4/1978 | Kegelman | 429/194 |
| 4,086,403 | 4/1978 | Whittingham | 429/194 |
| 4,133,856 | 1/1979 | Ikeda et al. | 429/224 |
| 4,160,070 | 7/1979 | Margalit | 429/194 |

*Primary Examiner*—Donald L. Walton
*Attorney, Agent, or Firm*—Ronald S. Cornell; Israel Nissenbaum

[57] ABSTRACT

A non-aqueous Li/MnO$_2$ cell having an electrolyte which improves the capacity thereof and which consists of an electrolyte salt such as LiClO$_4$ dissolved in 1,3 dioxolane.

5 Claims, No Drawings

NON-AQUEOUS LI/MNO₂ CELL

This invention relates to non-aqueous Li/MnO₂ cells and specifically to the electrolytes utilized therein.

In order for manganese dioxide (MnO₂) to be successfully utilized in cells containing lithium anodes it has generally been necessary to drive off substantially all of the retained water in the hygroscopic manganese dioxide. Thus, prior to use of the manganese dioxide as the cell cathode material, the manganese dioxide is rigorously heated. Such rigorous heat treatment and the driving off of retained water is necessitated by reactivity of the lithium, used as the anode material, with water whereby hydrogen gas is evolved and an unstable cell would result. Accordingly, in U.S. Pat. No. 4,133,856 issued to Ikeda et al on Jan. 9, 1979, not one, but several heating steps of the manganese dioxide are required in driving off most of the strongly retained water. Insufficient heating of the manganese dioxide is described in the patent as resulting in severe loss of capacity of cells containing such manganese dioxide as cathodes thereof.

In addition to the rigorous heating required for minimizing the effects of retained water, lithium/manganese dioxide cells are further described as containing electrolytes comprised of mixtures of propylene carbonate and dimethoxyethane with a lithium perchlorate salt dissolved therein. The propylene carbonate of the electrolyte has the further property of reacting with the lithium anode, to a limited extent, with the formation of a thin passivating film of lithium carbonate on the lithium anode. This film protects the lithium of the anode from reacting with the minimal amounts of water remaining in the manganese dioxide cathode even after the rigorous heat treatment. The film is ionically conductive and does not, to any significant extent, affect cell performance. Accordingly, cells currently being manufactured contain such electrolytes of propylene carbonate, with or without dimethoxyethane, which provide high conductivity and cell stability.

It is an object of the present invention to provide a stable lithium/manganese dioxide cell having an electrolyte which does not form a passivating film and which cell has significantly improved capacity. This and other objects, features and advantages of the present invention will be more closely evident from the following discussion.

Generally the present invention comprises a lithium/manganese dioxide (Li/MnO₂) cell which contains a 1,3 dioxolane electrolyte solvent in place of the aforementioned propylene carbonate (with or without dimethoxyethane). Though the use of 1,3 dioxolane, as an electrolyte salt solvent in lithium cells, is known from U.S. Pat. No. 4,071,665 issued to Garth on Jan. 31, 1978, its use in a cell having a manganese dioxide cathode would have been expected to provide an inferior cell because of the water retentive properties of manganese dioxide. From the Garth patent it is evident (Example 8 thereof) that lithium remains bright and unattacked by a dioxolane containing electrolyte. Accordingly, a passivating film is not found on the lithium surface. While this is not detrimental to the operation of cells as described therein, with water retaining cathode materials such as manganese dioxide it would have been expected to provide unstable cells. Without the passivating film provided by an electrolyte solvent such as propylene carbonate it would have been expected that water remaining in the manganese dioxide cathode, even after the heating steps as in the Ikeda patent, would detrimentally react with the unprotected lithium anode.

It has however been unexpectedly discovered that minimal amounts of water, retained in the manganese dioxide cathode, do not in fact react with the lithium anode but rather interact with the electrolyte salt and solvent as described in copending application Ser. No. 70,198 filed Aug. 27, 1979 now U.S. Pat. No. 4,279,972. Accordingly, the absence of the protective film is not in fact detrimental to cell stability as would have been expected for a Li/MnO₂ cell. In accordance with Garth's observation that there is an unpredictability with respect to how electrolyte solvents perform with given battery couples, it has been discovered that in a cell containing a Li/MnO₂ couple, not only does the dioxolane solvent provide a stable cell but in fact provides a cell having about three times the capacity of identical cells, containing the prior art propylene carbonate electrolyte solvent, when the cells are discharged at −20° C.

It is additionally noted that the Garth patent requires that an electrolyte consisting essentially of dioxolane should also have a polymerization inhibitor, such as pyridine therein. It has however been discovered that polymerization of the dioxolane solvent in a Li/MnO₂ cell is in fact only not significantly detrimental to the performance of low rate cells but is in fact preferred because of the minimization of electrolyte leakage thereby. In order to effect such polymerization of the dioxolane, passing an electric current therethrough has been found to be effective.

Whereas the propylene carbonate containing electrolyte of the prior art resulted in a protective film on the lithium anode the dioxolane electrolyte of the present invention does not provide such film. Accordingly, the degree of purity of the dioxolane, when used in a cell with a lithium anode, is higher than that required with the propylene carbonate containing electrolyte. The dioxolane itself must be substantially free of impurities to prevent detrimental reaction of such impurities with the lithium anode. Accordingly, it is preferred that the dioxolane be both distilled and dried prior to use in the Li/MnO₂ cell.

Since 1,3 dioxolane is a very good solvent it may be used as an electrolyte solvent with substantially all of the electrolyte salts commonly used in non-aqueous lithium cells. Such salts, in addition to the aforementioned LiClO₄, include alkali metal (preferably lithium) halides, hexafluorophosphates, hexafluoroarsenates, clovoborates and the like.

As a further indication of the efficacy of the dioxolane electrolyte solvent of the present invention as compared to the prior art, the following examples are presented. It is understood that such examples are for illustrative purposes only with any specific details enumerated therein not to be construed as limitations on the present invention. Unless otherwise indicated all parts are parts by weight.

EXAMPLE 1 (PRIOR ART)

A cell having the dimensions 1" (2.54 cm) diameter by 0.1" (0.254 cm) height and having a lithium disc anode (55 mg), a MnO₂ cathode (1000 mg) and an electrolyte of 1 molar LiClO₄ in 1:1 propylene carbonate-dimethoxyethane (300 mg), is discharged at −20° C. at 0.1 mA. The cell provides about 50 mAhrs to a 2 volt cutoff.

EXAMPLE 2

A cell identical to the cell in Example 1, but with an electrolyte of 1 molar $LiClO_4$ in 1,3 dioxolane—distilled and dried—(300 mg) is discharged at $-20°$ C. at 0.1 mA. The cell provides about 140 mAhrs to a 2 volt cutoff, about three times the capacity of the prior art cell in Example 1.

Under room temperature conditions, cells made in accordance with Examples 1 and 2 and discharged at 0.1 mA each provide operating voltages of about 2.9 volts and a capacity of about 220 mAhrs to a 2 volt cutoff. Because of the absence of the protective film in the cell with the dioxolane electrolyte the voltage thereof is slightly higher.

It is understood that the preceeding examples are illustrative of the advantages of the present invention as compared to the prior art. Changes in cell structure and components may be made without departing from the scope of the invention as defined in the following claims.

What is claimed is:

1. An electrochemical cell comprising a lithium anode, a manganese dioxide cathode having water retained therein and an electrolyte, wherein said electrolyte comprises an electrolyte salt dissolved in a non-aqueous electrolyte salt solvent comprised of 1,3 dioxolane substantially free of impurities which react with lithium.

2. The cell of claim 1 wherein said electrolye salt comprises $LiClO_4$.

3. The cell of claim 1 wherein said electrolyte salt solvent consists essentially of said 1,3 dioxolane.

4. The cell of claim 3 wherein said 1,3 dioxolane is polymerized.

5. The cell of claim 4 wherein said 1,3 dioxolane is polymerized by passing an electric current therethrough.

* * * * *